US007195383B2

(12) United States Patent
Gebauer

(10) Patent No.: US 7,195,383 B2
(45) Date of Patent: Mar. 27, 2007

(54) HEADLIGHTS FOR VEHICLES

(75) Inventor: Matthias Gebauer, Reutlingen (DE)

(73) Assignee: Automotive Linghting Reutlingen GmbH, Reutlingen (DE)

( * ) Notice: Subject to any disclaimer, the term of this patent is extended or adjusted under 35 U.S.C. 154(b) by 37 days.

(21) Appl. No.: 10/856,857

(22) Filed: Jun. 1, 2004

(65) Prior Publication Data

US 2004/0246739 A1 Dec. 9, 2004

(30) Foreign Application Priority Data

Jun. 4, 2003 (DE) ................................ 103 25 330

(51) Int. Cl.
*F21V 9/00* (2006.01)
*F21V 5/00* (2006.01)
*F21V 21/14* (2006.01)
*F21S 8/10* (2006.01)
*G02B 6/04* (2006.01)

(52) U.S. Cl. ...................... 362/511; 362/521; 362/525; 362/530; 362/554

(58) Field of Classification Search ................ 362/530, 362/538, 511, 512, 521, 525, 554
See application file for complete search history.

(56) References Cited

U.S. PATENT DOCUMENTS 3,569,933 A * 3/1971 Longenecker et al. ...... 340/458
5,184,883 A * 2/1993 Finch et al. ................ 362/511
5,311,410 A 5/1994 Hsu
5,434,756 A * 7/1995 Hsu et al. ................... 362/552
5,488,545 A * 1/1996 Kato et al. .................. 362/551
5,602,948 A * 2/1997 Currie ......................... 385/33
6,283,623 B1 * 9/2001 Chinniah et al. ........... 362/511
6,296,383 B1 * 10/2001 Henningsen ................ 362/552
6,491,420 B1 * 12/2002 Scifres ....................... 362/553
6,547,410 B1 * 4/2003 Pederson ..................... 362/35

* cited by examiner

*Primary Examiner*—John Anthony Ward
*Assistant Examiner*—David Makiya
(74) *Attorney, Agent, or Firm*—Paul Vincent

(57) ABSTRACT

Headlight for motor vehicles, comprising at least one light source and at least one light guide associated with each light source, into which the light emitted by the light source can be coupled via a light coupling surface, wherein each light guide is associated with a light terminator body into which the light from the light guide is passed, wherein the light terminator body has a light output surface and the output light can be imaged through a downstream lens, wherein the at least one light terminator body is fixed on or to a holder and the holder can be pivoted about at least one axis and/or be displaced in at least one plane relative to the at least one lens.

15 Claims, 2 Drawing Sheets

HEADLIGHTS FOR VEHICLES

This application claims Paris Convention priority of DE 103 25 330.0 filed Jun. 4, 2003 the complete disclosure of which is hereby incorporated by reference.

BACKGROUND OF THE INVENTION

The invention concerns a headlight for motor vehicles, comprising at least one light source and at least one light guide, associated with each light source, into which the light emitted by the light source can be coupled via a light coupling surface, wherein each light guide is associated with a light terminator body in which the light from the light guide can be further guided, wherein the light terminator body has a light output surface and the output light can be imaged by a downstream lens.

DE 41 39 267 A1 discloses e.g. a headlight for motor vehicles, comprising at least two light sources which are formed as light emitting surfaces of at least one light guide. Towards this end, the light is guided from a light source through the light guide to a location where it is irradiated and where its dispersion is influenced via a light plate or a prism, to be imaged by a lens. The headlight is thereby closed by a transparent end cap. The light terminator body disadvantageously emits light between the glass fiber and the lens with a distribution whose illumination gradient between the light/dark border at near field is small or appears partially spotted.

A further disadvantage is that no light range control is provided.

A light range control can be provided in conventional projection modules having a lens disposed in the path of the rays of a light source, with the light emitted by the light source being projected. The light range control is obtained through pivoting the projection (also PES) module. These projection systems are disadvantageous in that the light range control requires pivoting of the entire projection module about a pivot axis thereby requiring large gaps around the lens towards the bezel to permit motion of the projection system. Such gaps are undesirable with regard to design.

A design of this type also has a large number of parts which must be moved, i.e. reflector, lens, holder and diaphragm, which increases the costs. It is moreover disadvantageous that large forces act on the pivot means when the entire projection module must be moved. The pivot means must nevertheless withstand shocks during driving conditions.

It is therefore the underlying purpose of the invention to provide a headlight for motor vehicles having a light range control, wherein the gap width, which is undesirable with regard to design, between the lens of a projection system and the bezel is simultaneously reduced or even eliminated.

SUMMARY OF THE INVENTION

This object is achieved in accordance with the invention by a headlight, having at least one light terminator body fixed to or on a holder, the holder being pivotable about at least one axis and/or displaceable in at least one plane relative to the lens. In this manner, the lens may remain stationary relative to the bezel. In particular, the bezel and the lens or several lenses may be produced in one part or be connected to form one part to reduce the gap width to zero.

The headlight may thereby function as a low beam light, with the headlight comprising a light source whose light is introduced into a light guide. The light may be guided in the light guide via total internal reflection from any location to the light output or emitting location, i.e. the actual headlight. An intermediate part, i.e. a light terminator body is moreover provided as cross-sectional converter into which the light from the light guide is introduced and which has a light output cross-section whose shape substantially corresponds to the light distribution to be generated. The light terminator body thereby serves as cross-sectional converter as well as as light range guiding unit. The light emitted by the light terminator body impinges on a projecting lens unit, which then generates the final light distribution. The lenses thereby project the luminous end surfaces or light output surfaces of the light terminator bodies to obtain the final, desired light distribution. In principle, a cover plate with optical means may also be provided. However, this is not desired or required in most cases.

To realize light range control, the intermediate parts are moved by means of the holder in the one focal plane of the lens in which they are disposed. It is particularly advantageous for the light terminator bodies or their light output surfaces to be disposed in the focal plane of the lens for effecting a desired light distribution.

The headlight may thereby comprise a reflector, which is associated with the light source, for focussing the light on the light coupling surface of the light guide. The light coupling surface of the light guide may thereby be disposed at the focus of the reflector.

The light terminator bodies may, in particular, be associated with separate lenses, wherein several light terminator bodies are commonly fixed on a holder.

This requires that the foci of the lenses have the same or similar values, thereby ensuring that all intermediate parts, i.e. light terminator body, can be mounted on a holder, since the motion changes the light distribution of all lens systems by the same angle. The change of the position of the light terminator body in the focal plane of the lens leads to an angular rotation of the light distribution downstream of the lens. For greatly differing foci, a holder must be provided for each lens, which can be moved independently of the other holders.

In addition to the first axis or the first plane, a second axis of rotation or plane of displacement may alternatively be provided in which the holder can also be displaced or pivoted.

A second holder may be provided within the first holder, wherein the first holder can be pivoted about a first axis or be displaced in a first plane and the second holder is moved about this first axis or in the first plane together with the first holder. Moreover, motion of the second holder about a second axis or in a second plane may be provided with this second axis or second plane extending, in particular, perpendicular to the first axis or the first plane.

The first axis or plane may thereby coincide with the surface of the holder or extend parallel thereto. The second plane may be disposed substantially perpendicular thereto.

A second light terminator body may be disposed on the second holder, wherein, in particular, the light terminator body disposed on the second holder may provide the light portion for the 15° rise and for the region at the right-hand side, up to the center of the lane in a low beam light distribution.

The terminator body on the second holder may e.g. produce the light distribution in the first light distribution quadrant on a measuring screen disposed in front of the headlight to show its light distribution and which is usually divided into sectors, with a vertical central plane and a horizontal central plane being defined.

On the whole, in addition to pure linear motion or pure turning motions, mixed motions are also possible.

Towards this end, a holder may be rotatable as well as displaceable or two nested holders may be provided with one holder exercising a pivoting motion and the other holder a displacing motion.

If glass fiber is used as a light guide, the lenses as well as the light terminator bodies may be produced from any transparent light-guiding material, in particular of synthetic or plastic material, e.g. PC or PMMA.

If an infrared filter or LEDs are used as a light source, a corresponding material may also be used for the light guide itself, since the thermal load on the light guide is then sufficiently small. The light terminator body may thereby be tightly connected to the light guide, in particular in a material-bonding fashion. The light terminator body may be connected to the light guide using an optical adhesive or may be a one-piece component thereof, thereby producing a headlight system with an attractive design. Further advantages and features can be extracted from the remaining claimed features.

The invention is explained in more detail below with reference to the drawing.

DESCRIPTION OF THE PREFERRED EMBODIMENT

Figure 1:
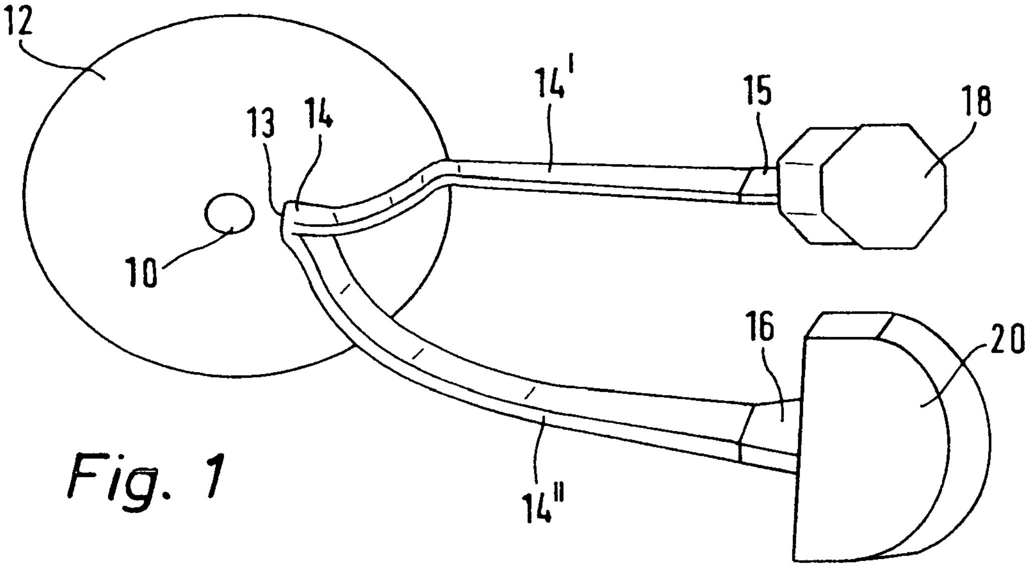
FIG. 1 shows a view of a headlight in accordance with prior art.

FIG. 1 shows a section or part of a conventional headlight comprising a light source 10 and a reflector 12 which focuses the light emitted by the light source onto a light coupling surface 13 of a light guide 14, which is divided into two light guiding strands 14' and 14". Each light guiding strand 14' and 14" leads to one light terminator body 15 or 16 which are each tightly connected to a lens 18 and 20, respectively. The lenses 18, 20 may have different designs in dependence on the light distribution to be generated as is produced through imaging of the light terminator body 15 or 16. The light is thereby fed from the light source 10 via the reflector 12 into the light coupling surface 13 of the light guide arms 14' and 14" where it is further guided through total internal reflection to the light terminator bodies 15 or 16. The light terminator bodies 15 and 16 have light output surfaces (not shown) whose cross-section is designed to emit substantially the desired light distribution, i.e. to match to the downstream light distribution.

The light distribution which exits the light output surfaces (not shown) is projected through the lenses 18 and 20 such that the desired light distribution is generated on the street or on a measuring screen in front of the headlight.

It is thereby disadvantageous that, to realize light range control, the lenses 18, 20 which are rigidly connected to the light terminator body 15, 16 and the light guide arms 14', 14" must also be moved thereby requiring relatively large gaps between a lens 15, 16 and a bezel (not shown) to permit motion of the entire module.

Figure 2:
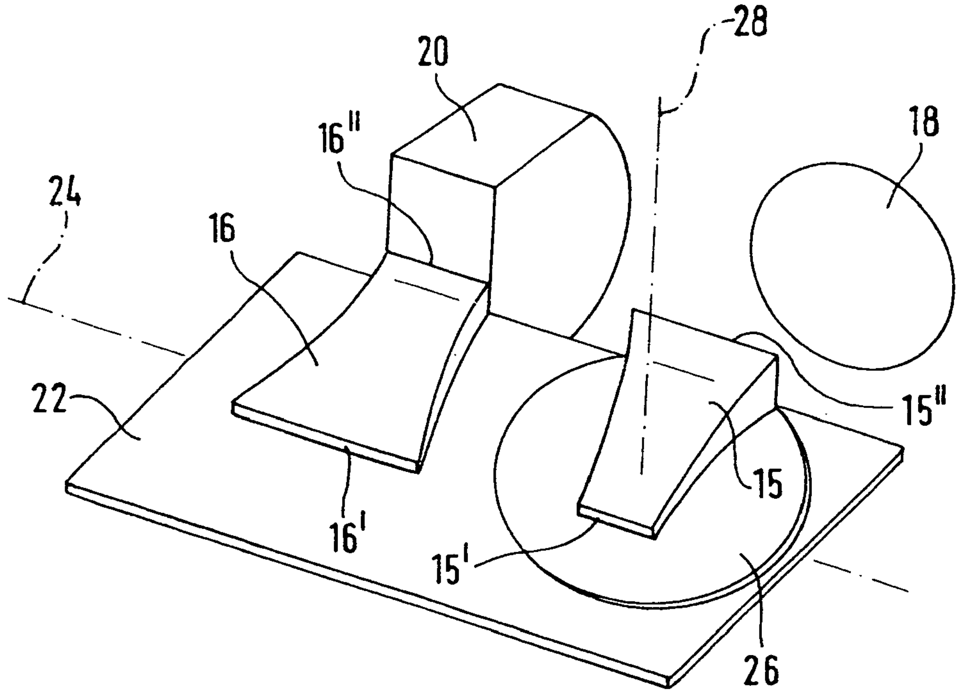
FIG. 2 shows a schematic view of a section of a headlight formed in accordance with the invention.

Based on the above-mentioned findings and in accordance with FIG. 2, the light terminator bodies 16 and 15 (identical parts have the same reference numerals as in FIG. 1) are fixed to a holder 22. The light input surfaces 16' and 15' of the light terminator bodies 15, 16 are connected to light guides or light guide arms (not shown) via which the light is introduced into the light terminator bodies 15 and 16. The transition between light guide and light terminator body may thereby be preferably in one piece or in a material-bonding fashion, e.g. via an optical adhesive, to reduce the boundary surfaces and thereby the light loss.

The light from the light source (not shown) is then output via the light output surfaces 15" and 16" of the light terminator bodies 15, 16 towards the lenses 18 and 20 to pass out of the system and be projected e.g. onto the street via these lenses 18 and 20. The light terminator bodies are made from a synthetic or plastic material. In dependence on the light source used, radiation which is thermally relatively uncritical is generated either by the light source itself, e.g. by an LED, or a glass fiber is interposed as a light guide.

The lenses are thereby also produced from a plastic material such as PMMA or PC and are tightly connected to the bezel (not shown) to prevent gaps between the bezel and the lens.

The light terminator body 16 is thereby rigidly disposed on the holder 22 and can be pivoted with same about the axis of rotation 24 which extends in the holder plane 22.

A second holder 26 is disposed on the holder 22 to extend in the same plane as the holder 22 and can be pivoted therewith about the axis 24. The light terminator body 15 is mounted to this second holder 26, which is also pivoted with the first holder 22 about the axis 24. This change of the intermediate parts in the focal plane of the lenses 18, 20 produces angular rotation of the light distribution from the lenses 18, 20. The lenses 18 and 20 thereby have approximately the same focus to permit common pivoting of both light terminator bodies 16 and 15. The second holder 26 can moreover be rotated within the plane of the first holder 22 about a second axis of rotation 28 which extends perpendicular to the first axis of rotation 24. The position of the light terminator body 15 is thereby horizontally displaced in the focal plane of the lens 18 thereby horizontally pivoting this light distribution. This permits realization of adaptive light distributions. The light terminator body 16 may generate the region of a dim light which is below the horizontal light/dark border on a measuring screen disposed in front of the headlight. In contrast thereto, the region of the 15° rise on the right-hand lane edge and the part of light distribution in the first quadrant of a low-beam light with a light/dark border extending substantially 1° below the horizontal central plane on a measuring screen disposed in front of the headlight and having a 15° rise on the right-hand lane edge can be obtained by the light terminator body 15.

The different light distributions can thereby be obtained through different configurations of the light output surfaces 16" and 15" of the light terminator bodies 15 and 16.

Figure 3A:
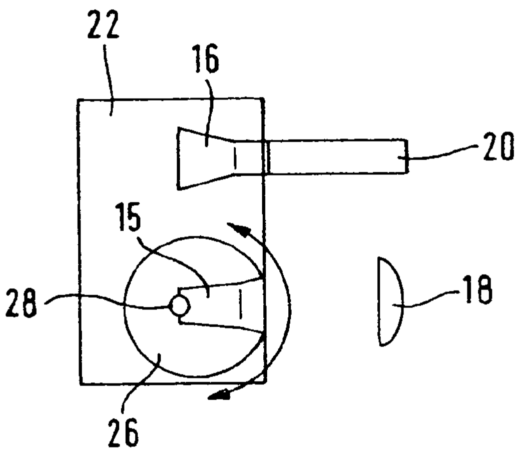
FIGS. 3*a, b* shows the motion of the holder in accordance with the invention.
Figure 3B:
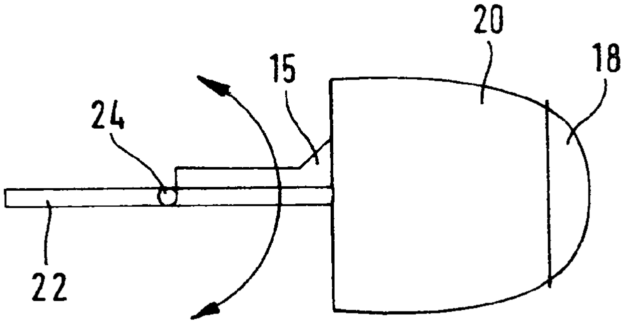

FIGS. 3*a* and *b* show the possible pivoting or rotational motions about the pivoting axes 24 and 28.

Figure 4A:
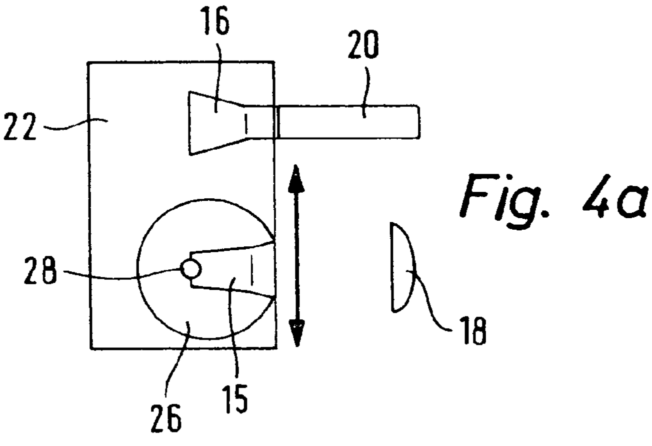
FIGS. 4*a, b* shows the motion of the holder in accordance with the invention.
Figure 4B:
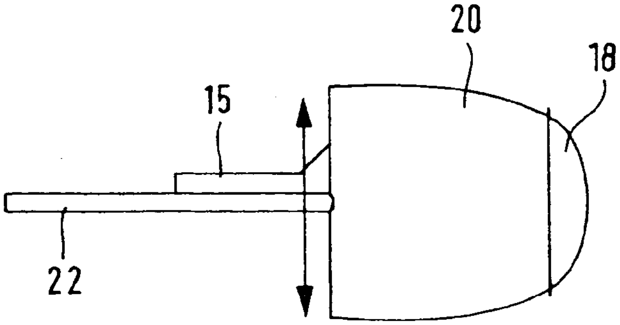

FIG. 4 shows one alternative embodiment, with FIG. 4*a* showing the motion of the holder 22 through translatory displacement in a first plane and FIG. 4*b* through translatory displacement in a plane perpendicular to that first plane. Rotation of the second holder 26 about the axis 28 may also be provided.

The present invention permits production of a light range control in a particularly simple fashion with an adaptive light distribution, which simultaneously reduces the number of movable parts and reduces or eliminates gaps, which are undesired with regard to design, by permitting a fixed arrangement of the lenses relative to the bezel. Costs are also reduced due to the one-piece structure of the bezel and lens.

I claim:

1. A headlight for motor vehicles, the headlight accepting light from at least one light source, the headlight comprising:

at least one light guide communicating with each light source, said light guide having a light coupling surface for passing light from the light source into said light guide;

a first holder disposed downstream of said light guide;

a light terminator body fixed to or on said first holder, said light terminator body in communication with said light guide to pass light from said light guide into said light terminator body, said light terminator body having a light output surface;

a lens disposed downstream of said light output surface for imaging light passing out through said light output surface;

means for pivoting and/or displacing said first holder relative to said lens, wherein said pivoting and/or displacing means comprise means for pivoting said first holder about at least one first axis and/or means for displacing said holder in at least one first plane; and a second holder disposed in or on said first holder, wherein said second holder carries one or more light terminator bodies and can be pivoted and/or displaced together with said first holder and is also pivotable and/or displaceable within said first holder about a second axis or in a second plane.

2. The headlight of claim 1, further comprising a plurality of terminator bodies each associated with a respective one of a plurality of lenses, said plurality of terminator bodies fixed together on said first holder.

3. The headlight of claim 2, wherein foci of said lenses are identical or similar.

4. The headlight of claim 1, wherein said second axis is perpendicular to said first axis and said second plane is perpendicular to said first plane.

5. The headlight of claim 1, wherein said first axis or said first plane extends in a plane of a surface of said first holder or parallel thereto.

6. The headlight of claim 4, wherein said first axis or said first plane extends in a plane of a surface of said first holder or parallel thereto.

7. The headlight of claim 1, wherein said light guide consists essentially of glass fiber, a PC, or a PMMA material.

8. The headlight of claim 1, wherein said light terminator body and/or said lens consists essentially of a transparent material.

9. The headlight of claim 8, wherein said transparent material is glass, PMMA or PC.

10. The headlight of claim 1, wherein said light terminator body is tightly connected to said light guide.

11. The headlight of claim 10, wherein said light terminator body is material-bonded to said light guide.

12. The headlight of claim 1, further comprising a reflector for focusing light from the light source onto said light coupling surface of said light guide.

13. The headlight of claim 1, wherein the headlight is structured and dimensioned for use with the light source when the light source comprises one or more LEDs.

14. The headlight of claim 1, wherein said lens comprises a tightly connected bezel.

15. The headlight of claim 14, wherein said bezel is integral with said lens.

* * * * *

UNITED STATES PATENT AND TRADEMARK OFFICE

CERTIFICATE OF CORRECTION

PATENT NO. : 7,195,383 B2
APPLICATION NO. : 10/856857
DATED : March 27, 2007
INVENTOR(S) : Matthias Gebauer It is certified that error appears in the above-identified patent and that said Letters Patent is hereby corrected as shown below:

On Title Page

Please amend the Assignee name as follows

--Item 73

Automotive ~~Linghting~~ Lighting Reutlingen GmbH --

Signed and Sealed this

Thirty-first Day of July, 2007

JON W. DUDAS
*Director of the United States Patent and Trademark Office*

UNITED STATES PATENT AND TRADEMARK OFFICE

CERTIFICATE OF CORRECTION

PATENT NO. : 7,195,383 B2
APPLICATION NO. : 10/856857
DATED : March 27, 2007
INVENTOR(S) : Matthias Gebauer It is certified that error appears in the above-identified patent and that said Letters Patent is hereby corrected as shown below:

On Title Page
Please amend the Assignee name as follows
Item 73
--Automotive ~~Linghting~~ Lighting Reutlingen GmbH --

Signed and Sealed this

Twenty-first Day of August, 2007

JON W. DUDAS
*Director of the United States Patent and Trademark Office*